United States Patent
Penttinen

(10) Patent No.: US 6,434,377 B1
(45) Date of Patent: Aug. 13, 2002

(54) PROCEDURE FOR THE SETUP OF AN EMERGENCY CALL MADE BY AN UNIDENTIFIED SUBSCRIBER IN A WIRELESS LOCAL LOOP

(75) Inventor: Simo Penttinen, Oulu (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/363,102

(22) Filed: Jul. 29, 1999

(30) Foreign Application Priority Data

Jan. 31, 1997 (FI) .................................................. 970436

(51) Int. Cl.[7] ............................................ H04M 11/00
(52) U.S. Cl. ........................ 455/404; 455/3.05; 455/426
(58) Field of Search ............................... 455/3.01, 3.05, 455/403, 404, 422, 450, 464, 426; 370/328, 329, 229; 379/37

(56) References Cited

U.S. PATENT DOCUMENTS

| | | | |
|---|---|---|---|
| 5,303,285 A | | 4/1994 | Kerihuel et al. |
| 5,475,735 A | * | 12/1995 | Williams et al. ............. 455/403 |
| 5,884,148 A | * | 3/1999 | Bilgic et al. ................. 455/404 |
| 6,185,412 B1 | * | 2/2001 | Pentikainen et al. ........ 455/404 |
| 6,275,481 B1 | * | 8/2001 | Penttinen .................... 370/329 |

FOREIGN PATENT DOCUMENTS

| | | |
|---|---|---|
| EP | 0 304 955 | 3/1989 |
| EP | 0 717 574 | 6/1996 |
| GB | 2 301 989 | 12/1996 |
| JP | 7-254933 | 10/1995 |
| WO | WO 96/31015 | 10/1996 |
| WO | WO 97/35404 | 9/1997 |
| WO | WO 97/48247 | 12/1997 |

OTHER PUBLICATIONS

1993, M. Mouly et al. "The GSM System for the Mobile Communications", EUROPE MEDIA, p. 436–440.
Jun. 30 1998, International Search Report for International Application No. PCT/FI98/00072.

* cited by examiner

*Primary Examiner*—Nay Maung
*Assistant Examiner*—Quochien B. Vuong
(74) *Attorney, Agent, or Firm*—Altera Law Group, LLC

(57) ABSTRACT

The invention relates to a procedure for the setup of an emergency call made by an unidentified subscriber in a wireless local loop, in which subscriber's stations (MS) are connected via a radio link over a base transceiver station (BS) to an access node (AN) and from the access node to a local exchange (LE) over a standard V5 interface, in which the subscriber ports are identified by means of an L3 address, and in which procedure subscriber and emergency call identification is carried out during call setup. An emergency call to a predetermined emergency number attempted by a subscriber unidentified and/or undefined in the local exchange is detected, and a free L3 address is selected and the unidentified subscriber's emergency call is set up using the free L3 address over a V5 interface in accordance with the ordinary call setup procedure.

2 Claims, 1 Drawing Sheet

PROCEDURE FOR THE SETUP OF AN EMERGENCY CALL MADE BY AN UNIDENTIFIED SUBSCRIBER IN A WIRELESS LOCAL LOOP

BACKGROUND OF THE INVENTION

The present invention relates to a procedure as defined in the preamble of claim 1.

The invention applies to a wireless local loop (WLL) in which subscriber's stations are connected via a radio link over a base transceiver station to an access node (AN) and from the access node to a local exchange over a standard V5 interface, in which the subscriber ports are identified by means of an L3 address.

In a GSM-based mobile network (GSM, Global System for Mobile Communications), it is possible to make a so-called emergency call even if the subscriber cannot be identified in the service network concerned (emergency setup). An emergency call can also be made from a mobile station containing no subscriber identification module (SIM). Subscribers connected to a local exchange via a V5 interface consistent with the ETS 300 347-1 standard are identified by their L3 address both in the local exchange and in the access node. The L3 address is an individual number for the subscriber port in the V5 interface. L3 address (Layer 3 address) refers to a layer 3 address according to the OSI model (Open Systems Interconnection).

When a subscriber in a GSM network cannot be served by his/her own network but is within the coverage area of a base transceiver station linked to a GSM based WLL access node, or if the subscriber is in his/her proper network but the subscriber identification module SIM fails, preventing the use of TMSI (Temporary Mobile Subscriber Identity) or IMSI (International Mobile Subscriber Identity) data for call setup, it is possible that the person will try to call a common emergency number if there is an emergency situation. The call will founder on the L3 address because the calling subscriber cannot be identified in the subscriber identification procedure, or authentication procedure, and the subscriber therefore has no L3 address available.

In a prior-art procedure, successful setup of an emergency call is ensured by defining non-existent extra subscribers in the local exchange and access node. In a situation where an unidentified subscriber is trying to call a common emergency number, the call is set up over a V5 interface using the identification data of a non-existent subscriber.

A problem with this prior-art procedure is that it increases the size of the subscriber database.

The object of the invention is to eliminate the above-mentioned drawback.

A specific object of the invention is to disclose a procedure that enables a call originated by an unidentified and/or undefined subscriber in a mobile network to be set up over a V5 interface without the need to create non-existent subscribers in the local exchange.

SUMMARY OF THE INVENTION

The procedure of the invention is characterised by what is presented in claim 1.

According to the invention, an emergency call to a predetermined emergency number attempted by a subscriber unidentified and/or undefined in the local exchange is detected during an emergency call and subscriber identification procedure, and a free L3 address is selected and the unidentified subscriber's emergency call is set up using this free L3 address over a V5 interface in accordance with the ordinary call setup procedure.

In an embodiment of the procedure, the free L3 address is a normal L3 address of an existing subscriber.

In an embodiment of the procedure, the free L3 address is a predetermined value in the V5/L3 address range, and this value has been reserved for the setup of emergency calls, to be used for emergency calls made by unidentified subscribers.

In the following, the invention will be described in detail by the aid of examples of its embodiments by referring to the attached drawing, in which.

RELATED DESCRIPTION OF THE INVENTION

Figure 1:
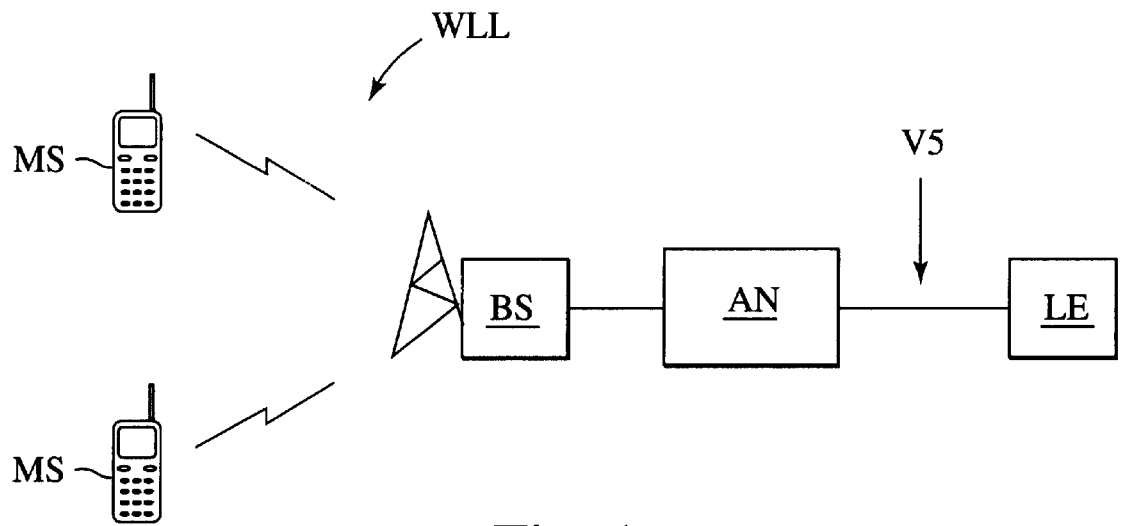
FIG. 1 presents a diagram representing an example of a system employing the procedure of the invention.

FIG. 1 shows a wireless local loop WLL in which subscriber's stations MS are connected over a radio link via a base transceiver station BS to an access node AN and from the access node to a wired network local exchange LE using a V5 interface consistent with the ETS 300 347-1 standard.

Figure 2:
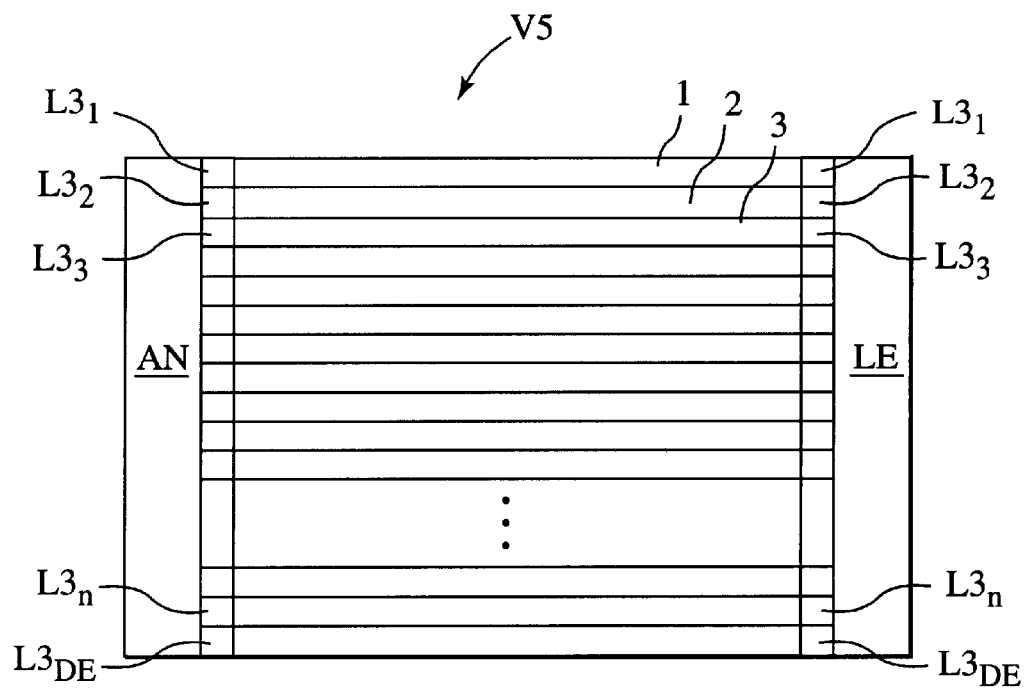
FIG. 2 presents a diagram representing the V5 interface in the system in FIG. 1.

FIG. 2 is a diagrammatic illustration of the division of a V5 interface into a number of time slot channels 1 . . . n. For each subscriber defined, a subscriber port has been defined in the access node AN and in the local exchange LE. The subscriber port is identified by means of an L3 address $L3_1 \ldots L3_n$. A call to a defined subscriber is normally set up using a subscriber port identified by the L3 address. By contrast, in a situation where an unidentified subscriber, e.g. a subscriber in the GSM network, enters the coverage area of a base station linked to a WLL access node AN and tries to make a call to a common emergency number, such an emergency call is set up by using in the V5 interface a borrowed L3 address for which the corresponding subscriber port is free at the time. When the call is started, the access node AN detects a channel reservation request initiated with an EMERGENCY_SETUP indicator. Identification of the subscriber in the authentication procedure fails because the subscriber has not been defined in the local exchange LE. In this case, the access node AN selects a free L3 address of an existing defined subscriber and sets up the call using this free L3 address over the V5 interface. Once the connection has been formed, the access node AN transmits the dialling information for the common emergency number over the V5 interface and the local exchange LE sets up a call free of charge to the common emergency number in accordance with the conventional call setup procedure.

The same can also be implemented by reserving in the V5 interface one or more channels for emergency communication using a so-called dummy_emergency-L3 address $L3_{DE}$. Such a dummy_emergency-L3 address $L3_{DE}$ is a general-purpose L3 address in the V5 interface dedicated exclusively for emergency communication. The dummy_ emergency-L3 address $L3_{DE}$ does not increase the size of the database because the subscriber database need not contain any other information except the information that that there must not be any other subscriber at the address number concerned. A call started with a dummy_emergency identifier is, under control of the local exchange LE, always connected to a common emergency number.

The invention is not restricted to the embodiment example described above, but instead many variations are possible within the scope of the inventive idea defined by the claims.

I claim:

1. A procedure for the setup of an emergency call made by an unidentified subscriber in a wireless local loop, in which subscriber's stations are connected via a radio link over a base transceiver station to an access node and from the access node to a local exchange over a standard V5 interface, in which the subscriber ports are identified by means of an L3 address, and in which procedure subscriber and emergency call identification is carried out during call setup, comprising:

detecting an emergency call to a predetermined emergency number attempted by a subscriber unidentified and/or undefined in the local exchange, and selecting a free L3 address and the unidentified subscriber's emergency call is set up using this free L3 address over a V5 interface in accordance with the ordinary call setup procedure, wherein the free L3 address is a normal L3 address of an existing subscriber port.

2. The procedure as defined in claim 1, wherein a common L3 address for emergency calls is defined in the V5 interface, and this L3 address is used for emergency calls made by unidentified subscribers.

* * * * *

UNITED STATES PATENT AND TRADEMARK OFFICE
CERTIFICATE OF CORRECTION

PATENT NO.    : 6,434,337 B1
DATED         : August 13, 2002
INVENTOR(S)   : Simo Penttinen It is certified that error appears in the above-identified patent and that said Letters Patent is hereby corrected as shown below:

<u>Title page,</u>
Please insert in item [63] as follows:
--                    Related U.S. Application Data
[63] Continuation of application No. PCT/FI98/00072, filed on January 26, 1998 --

Signed and Sealed this

Thirteenth Day of May, 2003

JAMES E. ROGAN
*Director of the United States Patent and Trademark Office*

UNITED STATES PATENT AND TRADEMARK OFFICE
CERTIFICATE OF CORRECTION

PATENT NO.   : 6,434,377 B1
DATED        : August 13, 2002
INVENTOR(S)  : Simo Penttinen It is certified that error appears in the above-identified patent and that said Letters Patent is hereby corrected as shown below:

<u>Title page,</u>
Please insert in item [63] as follows:
--                         Related U.S. Application Data
[63] Continuation of application No. PCT/FI98/00072, filed on January 26, 1998 --

Signed and Sealed this

Twenty-fifth Day of November, 2003

JAMES E. ROGAN
*Director of the United States Patent and Trademark Office*